V. M. HARRIS.
RECTIFIER.
APPLICATION FILED AUG. 24, 1912.
1,119,951.
Patented Dec. 8, 1914.
2 SHEETS—SHEET 1.
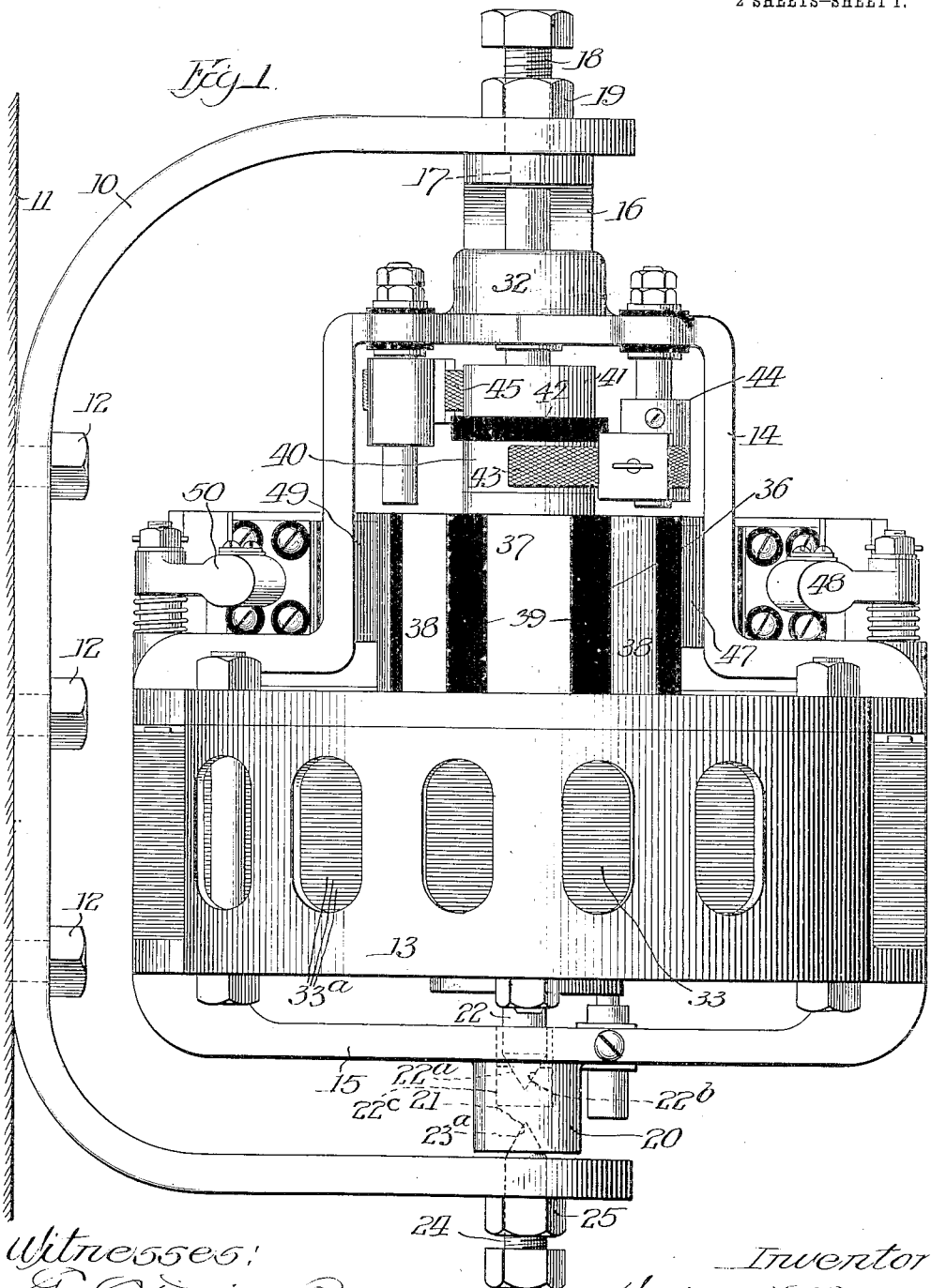
Witnesses:
Inventor:
Varian M. Harris,

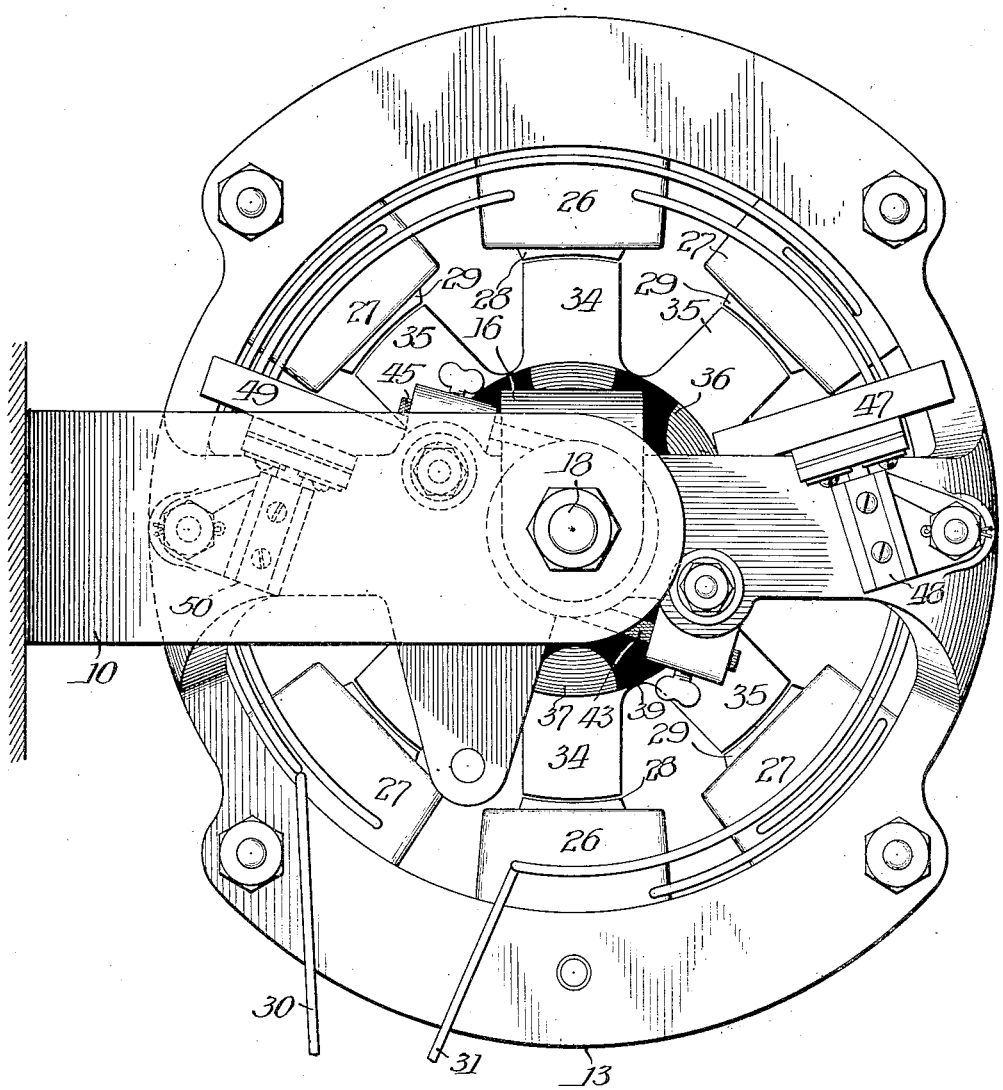

UNITED STATES PATENT OFFICE.

VARIAN M. HARRIS, OF CHICAGO, ILLINOIS, ASSIGNOR TO HENRY S. HAWLEY, TRUSTEE, OF CHICAGO, ILLINOIS.

RECTIFIER.

1,119,951.  Specification of Letters Patent.  Patented Dec. 8, 1914.

Application filed August 24, 1912. Serial No. 716,807.

*To all whom it may concern:*

Be it known that I, VARIAN M. HARRIS, a citizen of the United States, residing at Chicago, in the county of Cook and State of Illinois, have invented certain new and useful Improvements in Rectifiers, of which the following is a specification.

My invention relates to rectifiers, and refers particularly to the class of so-called mechanical rectifiers for changing alternating current into pulsating unidirectional current, or vice versa.

I am aware that mechanical rectifiers have been used in the past, but these proved unsatisfactory on account of the fact that no provision was made for cutting the wave phases of the alternating current at absolutely uniform points in converting the alternating into unidirectional current. The lack of means for compensating for the variations in the wave phases of alternating current lines has heretofore been a cause of great difficulty in the operation of mechanical rectifiers.

It is the object of my invention to provide means for compensating for current variations in the main line, and in this way to insure a uniform and correct cutting of the wave phases in converting the alternating into unidirectional current.

The motor which forms a part of my invention has its field element and rotor maintained in perfect synchronous relation by means hereinafter described, and in this way the current-converting, or rectifying means which is used is enabled to operate accurately and efficiently.

These and other advantages of my invention will be more readily understood by reference to the accompanying drawings, which represent a preferred embodiment of my invention, and in which—

Figure 1 is a side elevation of my motor and rectifier, and Fig. 2 is a plan of the apparatus shown in Fig. 1.

My improved motor is carried by a bracket 10, which is suitably fastened to a panel 11 by means of the bolts 12. The field element consists of a casing 13 provided with an upper spider 14 and a lower spider 15. To the upper spider 14 is attached the bearing member 16 having an aperture 17, which is engaged by the end of the bearing screw 18, the latter being locked in adjusted position by the nut 19. The lower spider 15 is provided with the bearing member 20, having the recess 21 into which the beveled end 23ª of the screw 24 projects, thereby supporting the field element. The screw 24 is locked in position by the nut 25. It will thus be apparent that the field element as a whole, with its spiders 14 and 15, is freely oscillatory on an axis which passes through the screws 18 and 24.

The field casing 13 is provided with a series of alternate poles 26 and a second series of poles 27, these poles having the pole faces 28 and 29, respectively. Each of the poles 26 and 27 is provided with windings in the usual manner, which are connected with each other and by the conductors 30 and 31 with a source of single-phase alternating current. The poles 26 and 27 are so wound that the polarity of all of the alternate poles 26 is the same, while at the same time the poles 27 have the opposite polarity. On account of the alternations of the main current, the polarity of all of these poles is, of course, constantly changing.

The rotor shaft 22 has a beveled end 22ª, which is supported in the recess 22ᵇ in the bearing block 22ᶜ of the bearing member 20, and on the opposite end the shaft 22 has its bearing in the bearing member 32 supported on or made integral with the upper spider 14. The upper end of the rotor shaft 22 is in line with the screw 18, thereby making the field element and the rotor coaxial. Mounted on the rotor shaft 22 is the rotor 33 consisting of a plurality of laminæ 33ª, of steel or other suitable metal, these laminæ being insulated from each other in the usual manner. The laminæ are formed with a plurality of alternate pole facess 34 and 35. Also mounted on the rotor shaft 22 is the commutator 36 having a plurality of segments 37 and 38, these segments being insulated from each other by the portions 39 of the commutator. The number of segments in the commutator 36 is preferably the same as the number of pole faces of the rotor and the number of pole faces of the field element. Also mounted on the rotor shaft 22 are the slip rings 40 and 41, separated from each other by the section 42 of insulating material. One of the slip rings, as, for example, 40, is electrically connected with alternate commutator segments 38, while the other slip ring, as, for example, 41, is similarly connected with the other series of commutator segments 37. The slip ring 40 is engaged by the brush 43 held by the brush holder 44 attached to the spider 14, and the brush 45 engages the slip ring 41, this brush 45 being held by the brush holder 46, also supported by the spider 14. Engaging the commutator 36 is the brush 47, which is held by the brush holder 48, which, in turn, is carried by the spider 14. Similarly, the brush 49 also engages the commutator 36. The brush 49 is carried by the brush holder 50, which is supported on the spider 14. The brushes 47 and 49 are so positioned that while the brush 47, for example, engages one of the commutator segments 37, the brush 49 will engage one of the segments 38.

Having thus described the construction of the various parts which are used in my invention, the operation of the same may now be readily understood: The rotor is first brought up to speed by any suitable starting device. Such starting device forms no part of the present invention. When the rotor is thus rotating, it is kept at speed and in synchronism with the main current by the magnetic attraction exerted by the pole faces 28 and 29 of the field element on the pole faces 34 and 35 of the rotor. In order to clearly understand this action, let us assume that the pole faces 34 and 35 are midway between adjacent pole faces 28 and 29 of the field element. The wave phase of the alternating current is now at its maximum point. If the rotor were at rest, it will be evident that the magnetic attraction exerted by the various pole faces of the field element would exactly counterbalance each other, so that there would be no rotation of the rotor. On the other hand, since the rotor has already been brought up to speed by some suitable device, the inertia of the rotor carries the pole faces of the rotor toward the pole faces of the field element. As this action takes place, the wave phase gradually decreases until, when the pole faces of the rotor are exactly opposite the pole faces of the field element, the neutral point of the wave phase is reached. The inertia of the rotor continues to carry it around, however, and this inertia overcomes the magnetic attraction exerted by the pole faces of the field element until the pole faces of the rotor reach a position midway between the pole faces of the field element. When the pole faces of the rotor pass these positions, however, the magnetic attraction of the pole faces of the field element again attracts the pole faces of the rotor in the direction of rotation, and the speed of the rotor is thus maintained. Now, let us assume that a mechanically fixed field element were used. If the frequency of the cycles of the main line should become greater than normal, the neutral points of the wave phases would be reached before the pole faces of the rotor reach positions exactly opposite the pole faces of the field element, and the next succeeding wave phase would begin slightly before the pole faces of the rotor had reached this position. The effect of this would be to give the rotor a slightly greater impetus and to increase its speed, and thereby bring it into exact synchronism with the alternations of the main line.

The conditions which have just been described would take place with a mechanically fixed field element, provided the waves were in the form of a true sine curve. It is well-known, however, that commercial sources of alternating current do not generate waves in the form of true sine curves, so that in order to maintain the rotor of a motor in exact synchronism with the alternating current with which the field element of said motor is supplied, compensation must be made for the inequalities of the shapes of the waves. I accomplish this result by the free oscillation of the field element. With such a freely oscillatory field element, during operation of the machine this field element would tend to rotate in a direction opposite to the direction of rotation of the rotor by reason of the mutual attraction between these elements. In the present embodiment of my invention this tendency is counteracted by mounting the bearings of the rotor in the field element itself, and also by the frictional mounting of the field element, so that the friction of the bearings, the inertia of the field element, and the windage of the rotor (tending to rotate the field element in the same direction as the rotation of the rotor) cause the field element to remain in substantially the same position during the operation of the machine. On account of the fact that the field element is freely oscillatory, however, any variations in the current supply to this element causes the latter to rotate slightly in one direction or the other to maintain a perfect synchronous relation between the alternating current supplied to the field element and the rotor. Although I have mentioned the bearings in the field element as one of the frictional means for retarding the rotation of the field element, other means could be used for the same purpose; for example, resilient stops, or the like, such as shown in my copending application Serial No. 629,466, filed May 25, 1911.

Passing now to a description of the operation of the current converting means of my rectifier, current from the main source of alternating current is introduced into the brushes 43 and 45 through suitable conductors, the current passing through the conductors 30 and 31 to the field element being in the form of a shunt from the main conductors. The current passing through the brush 45, for example, next passes through the slip ring 41 to the segments 37, and then out through the brush 49, which, we will assume, is engaging one of the segments 37, through a conductor attached to said brush. Similarly, at the same instant (assuming the circuit in which the brushes 47 and 49 are included to be closed) current of the opposite polarity will pass from brush 47 to segments 38 and then to brush 43, thereby completing the circuit with the source of alternating current.

It will now be apparent that if the rotor were stationary, the current passing through the conductors attached to the brushes 47 and 49 would be alternating and of exactly the same nature as the current passing through the brushes 43 and 45. The rotor, however, is rotating in exact synchronism with the main current, a small proportion of which is supplied to the windings of the field element, so that while the brush 49, for example, is in engagement with a segment 37 during one phase of the alternation of the main line, when the next phase takes place a commutator segment 38 is brought into contact with the brush 49, so that the pulsations passing out through the brush 49 are always of one polarity, while the pulsations passing out through the brush 47 are similarly always of the opposite polarity. By having the brushes 47 mounted on the oscillatory field element, these waves are always cut at exactly the right point, and compensation for the irregularity of form of the waves is made.

It will be apparent to those skilled in the art that many changes could be made in the detailed construction of the apparatus which I have described without departing from the spirit or scope of my invention.

What I claim is:

1. An alternating current rectifier, comprising the combination of a rotor, a field element, means for mounting said field element for oscillatory motion, a commutator rotatable with said rotor, means for conducting alternating current to said commutator, and means for carrying the rectified current away from said commutator, substantially as described.

2. An alternating current rectifier, comprising the combination of a rotor, a field element, means for mounting said field element for oscillatory motion, means for exciting the poles of said field element from a source of alternating current, a commutator rotatable with said rotor, said commutator comprising a pair of segments insulated from each other, means for conducting the current to said segments from said source, and means for carrying current away from said segments, whereby, during rotation of said rotor in synchronism with said source, the current passing into said commutator will be changed from alternating to unidirectional, substantially as described.

3. In a rectifier, the combination of a field element, means for mounting said field element for oscillatory motion, a rotor mounted with its bearings in said field element, a commutator rotatable with said rotor, said commutator having a pair of segments insulated from each other, electrically conducting means connected with each of said segments, and a brush for engaging each of said segments, said brushes being mounted on said field element, substantially as described.

4. An alternating current rectifier, comprising the combination of a rotor, a field element, means for mounting said field element for oscillatory motion, means for exciting the poles of said field element from a source of alternating current, a commutator rotatable with said rotor, said commutator comprising a pair of segments insulated from each other, a slip ring electrically connected to each of said segments, a brush engaging each of said segments, said brushes being mounted on and movable with said field element whereby during rotation of said rotor in synchronism with said source said brushes are adjusted to compensate for variations in the wave phases of said current, and a brush engaging each of said slip rings whereby the alternating current passing through one set of brushes to said commutator will be conducted through the other set of brushes from said commutator as unidirectional current, substantially as described.

VARIAN M. HARRIS.

Witnesses:
HENRY M. HUXLEY,
T. D. BUTLER.